(12) United States Patent
Wu

(10) Patent No.: US 10,986,495 B2
(45) Date of Patent: Apr. 20, 2021

(54) INTERCEPTION METHOD AND APPARATUS BASED ON LOCAL BREAKOUT

(71) Applicant: Baicells Technologies Co. Ltd., Beijing (CN)

(72) Inventor: Yanguang Wu, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 232 days.

(21) Appl. No.: 16/085,734

(22) PCT Filed: Mar. 16, 2017

(86) PCT No.: PCT/CN2017/076903
§ 371 (c)(1),
(2) Date: Dec. 12, 2018

(87) PCT Pub. No.: WO2017/157314
PCT Pub. Date: Sep. 21, 2017

(65) Prior Publication Data
US 2019/0253880 A1 Aug. 15, 2019

(30) Foreign Application Priority Data
Mar. 17, 2016 (CN) .......................... 201610154505.2

(51) Int. Cl.
*H04W 12/00* (2021.01)
*H04L 29/06* (2006.01)
*H04L 29/08* (2006.01)

(52) U.S. Cl.
CPC ....... *H04W 12/007* (2019.01); *H04L 63/0281* (2013.01); *H04L 63/30* (2013.01); *H04L 67/28* (2013.01)

(58) Field of Classification Search
CPC combination set(s) only.
See application file for complete search history.

(56) References Cited

U.S. PATENT DOCUMENTS 8,605,655 B1 * 12/2013 Sahai ................ H04M 15/8016
370/328
10,582,379 B2 * 3/2020 Youn ................... H04W 12/001
(Continued)

FOREIGN PATENT DOCUMENTS

| CN | 1870683 A | 11/2006 |
| CN | 101325781 A | 12/2008 |

(Continued)

OTHER PUBLICATIONS

Cartmell (John Cartmell, "Meeting Lawful Interception Requirements for Selected IP Traffic Offload and Local IP Access Traffic", IEEE 978-1-4799-1535-4/13, 2013). (Year: 2013).*

(Continued)

*Primary Examiner* — Piotr Poltorak
(74) *Attorney, Agent, or Firm* — TraskBritt

(57) ABSTRACT

The present disclosure provides a method and a device for interception based on Local Break Out (LBO). The method includes: receiving, by a small base station, an interception task instructing the small base station to intercept an interception target; intercepting, by the small base station, LBO data of the interception target based on the interception task to obtain intercepted data; and transmitting, by the small base station, the intercepted data. The present disclosure can solve the problem in the related art that data of an interception target cannot be intercepted in an LBO scenario.

14 Claims, 6 Drawing Sheets

(56) References Cited

U.S. PATENT DOCUMENTS

| | | | | |
|---|---|---|---|---|
| 2002/0049913 | A1* | 4/2002 | Lumme | H04W 12/001 726/13 |
| 2002/0150096 | A1* | 10/2002 | Sjoblom | H04L 63/0428 370/389 |
| 2004/0095894 | A1* | 5/2004 | Eloranta | H04L 63/306 370/252 |
| 2010/0216484 | A1* | 8/2010 | Zhou | H04W 76/12 455/450 |
| 2011/0280217 | A1* | 11/2011 | Drevon | H04W 48/18 370/331 |
| 2011/0314177 | A1* | 12/2011 | Harp | H04L 63/306 709/238 |
| 2012/0076303 | A1* | 3/2012 | O'Leary | H04W 12/001 380/270 |
| 2012/0167165 | A1* | 6/2012 | Kim | H04W 12/007 726/1 |
| 2012/0269162 | A1* | 10/2012 | Vesterinen | H04W 12/0602 370/331 |
| 2013/0286869 | A1* | 10/2013 | Woelker | H04L 63/306 370/252 |
| 2013/0326631 | A1* | 12/2013 | Cartmell | H04L 63/0227 726/26 |
| 2014/0153504 | A1* | 6/2014 | Wang | H04L 47/40 370/329 |
| 2015/0050937 | A1* | 2/2015 | Rosar | H04W 8/082 455/445 |
| 2015/0365845 | A1 | 12/2015 | Lonka et al. | |
| 2017/0250952 | A1* | 8/2017 | Westberg | H04L 63/0272 |
| 2017/0339552 | A1* | 11/2017 | Xu | G06F 16/437 |
| 2018/0248707 | A1* | 8/2018 | Rune | H04L 12/1407 |

FOREIGN PATENT DOCUMENTS

| | | |
|---|---|---|
| CN | 101753526 A | 6/2010 |
| CN | 102172059 A | 8/2011 |
| CN | 105704140 A | 6/2016 |
| CN | 105847241 A | 8/2016 |
| CN | 105848141 A | 8/2016 |
| WO | WO-2014008913 A1 * | 1/2014 ........... H04L 63/306 |

OTHER PUBLICATIONS

International Search Report and Written Opinion received for PCT Patent Application No. PCT/CN2017/076903, dated Jun. 6, 2017, 11 pages (3 pages of English Translation and 8 pages of Original Document).

* cited by examiner

INTERCEPTION METHOD AND APPARATUS BASED ON LOCAL BREAKOUT

CROSS-REFERENCE TO RELATED APPLICATIONS

This application is a national phase entry under 35 U.S.C. § 371 of International Patent Application PCT/CN2017/076903, filed Mar. 16, 2017, designating the United States of America and published as International Patent Publication WO 2017/157314 A1 on Sep. 21, 2017, which claims the benefit under Article 8 of the Patent Cooperation Treaty to Chinese Patent Application Serial No. 201610154505.2, filed Mar. 17, 2016.

FIELD

The present disclosure relates to communication technology, and more particularly, to a method and a device for interception based on Local BreakOut (LBO).

BACKGROUND

With the rapid development of smart terminals and video technologies, data in mobile networks increases explosively. In order to reduce the load on a core network device (Evolved Packet Core, or EPC) of a mobile network, some local datagrams for low added-value services may be routed directly to a Public Data Network (PDN). This is referred to as Local Break Out (LBO). FIG. 1 is a schematic diagram showing a network deployment in an LBO service application scenario.

As shown in FIG. 1, after a User Equipment (Terminal) has entered a network, its IP datagrams transmitted from a base station are routed directly to the Internet. That is, the base station serves as the last hop for a mobile network device to offload user traffic data locally to the Internet. The LBO has an increasingly wider range of application scenarios in mobile networks.

Lawful Interception (LI) is an action allowed by law to intercept communications. Conventionally, the LI technique is provided according to standards defined by the $3^{rd}$ Generation Partnership Project (3GPP). FIG. 2 shows an LI architecture for Serving Gateway (S-GW)/Packet Data Network Gateway (PDN-GW)/evolved Packet Data Gateway (ePDG) in an Evolved Packet System (EPS) defined in 3GPP TS 33. 107.

In FIG. 2, the Law Enforcement Monitoring Facility (LEMF) is a monitoring device; the Mediation Function, ADMinistration Function (ADMF), Delivery Function2 and Delivery Function3 are all LI devices. For the purpose of description, they are referred to as Lawful Interception Gateway (LIG) collectively. In the figure, an X1_1 interface is provided for transmitting an interception instruction to an intercepted device, an X2 interface is provided for transmitting Interception Related Information (IRI) associated with signaling control in a mobile network, and an X3 interface is provided for transmitting intercepted Communication Contents (CCs).

In an interception request transmitted via the X1_1 interface, only the information associated with interception signaling control, i.e., the X2 IRI information, is required. Alternatively, both the X2 IRI and the X3 CC can be required and they can be associated with each other by a bearer, i.e., each bearer is associated with the CC transmitted over the bearer. Accordingly, each of the contents reported to the LIG via the X2 interface and via the X3 interface carries a feature value, such that the LIG can associate the reported X2 IRI with the reported X3 CC. This feature value is assigned by interception devices (S-GW, PDN-GW and ePDG) on a per bearer basis.

Currently, in a mobile network, intercepted targets are mainly network element devices in a core network device. For example, in an EPS, the intercepted targets defined in 3GPP protocols include a Mobility Management Entity (MME), S-GW, PDN-GW, ePDG and Home Subscriber Server (HSS). Due to the path of data flow, the MME/HSS mainly provides IRI, such as a location of the intercepted target, some events (attachment, bearer activation and modification) associated with the intercepted target and a Quality of Service (QoS) of a bearer. The corresponding user plane devices, such as S-GW, PDN-GW and ePDG can provide some intercepted user datagrams in addition to some IRI. However, in an LBO scenario, as traffic is offloaded at an eNodeB or a local gateway, without being delivered to the S-GW, PDN-GW or ePDG, it is currently impossible to intercept any events associated with the intercepted target in the LBO scenario.

There are currently no effective solutions to the above problems.

BRIEF SUMMARY

The embodiments of the present disclosure provide a method and a device for interception based on LBO, capable of solving at least the problem in the related art that data of an interception target cannot be intercepted in an LBO scenario.

In an aspect of the embodiments of the present disclosure, a method for interception based on LBO is provided. The method includes: receiving, by a small base station, an interception task instructing the small base station to intercept an interception target; intercepting, by the small base station, LBO data of the interception target based on the interception task to obtain intercepted data; and transmitting, by the small base station, the intercepted data.

Optionally, the interception task is transmitted by a core network device and the small base station receiving the interception task includes: receiving, by the small base station, the interception task generated by the core network device based on an interception request from an interception gateway. The interception task carries a feature value generated by the core network device for each bearer of the interception target for associating the intercepted data with the corresponding bearer of the interception target.

Optionally, the small base station transmitting the intercepted data includes: establishing, by the small base station, an intercepted data transmission channel for transmission of the intercepted data between the small base station and the core network device; and transmitting, by the small base station, the intercepted data to the core network device via the intercepted data transmission channel.

Optionally, the small base station transmitting the intercepted data includes: transmitting, by the small base station, uplink and downlink traffic data of the interception target.

Optionally, the interception task is transmitted by an interception proxy to which the interception target belongs. The small base station receiving the interception task includes: receiving, by the small base station, the interception task generated by the interception proxy to which the interception target belongs based on an interception request from an interception gateway. The small base station transmitting the intercepted data includes: transmitting, by the small base station, the intercepted data to the interception proxy, such that the interception proxy forwards the intercepted data.

Optionally, the intercepted data includes signaling data and traffic data. The traffic data includes uplink and downlink traffic data of the interception target. The signaling data includes at least one of: data on attachment time of the interception target, data on geographical location of the interception target, data on a bearer used by the interception target, a signaling message for the interception target.

Optionally, the interception task carries an address for storing the intercepted data and the small base station transmitting the intercepted data includes: transmitting, by the small base station, the intercepted data to the interception proxy, such that the interception proxy forwards the intercepted data to the address.

Optionally, the method further includes, subsequent to the small base station receiving the interception task: assigning, by the small base station, a feature value for each bearer of the interception target, for associating the intercepted data with the corresponding bearer of the interception target; and transmitting, by the small base station, the intercepted data carrying the feature value to the interception proxy.

In an aspect of the embodiments of the present disclosure, a device for interception based on LBO is provided. The device includes: a receiving unit configured to receive an interception task instructing a small base station to intercept an interception target; an intercepting unit configured to intercept LBO data of the interception target based on the interception task to obtain intercepted data; and a transmitting unit configured to transmit the intercepted data.

Optionally, the interception task is transmitted by a core network device and the receiving unit includes: a receiving module configured to receive the interception task generated by the core network device based on an interception request from an interception gateway. The interception task carries a feature value generated by the core network device for each bearer of the interception target for associating the intercepted data with the corresponding bearer of the interception target.

Optionally, the transmitting unit includes: an establishing module configured to establish an intercepted data transmission channel for transmission of the intercepted data between the small base station and the core network device; and a transmitting module configured to transmit the intercepted data to the core network device via the intercepted data transmission channel.

Optionally, the transmitting unit is further configured to transmit uplink and downlink traffic data of the interception target.

Optionally, the interception task is transmitted by an interception proxy to which the interception target belongs. The receiving unit is further configured to receive the interception task generated by the interception proxy to which the interception target belongs based on an interception request from an interception gateway. The transmitting unit is further configured to transmit the intercepted data to the interception proxy, such that the interception proxy forwards the intercepted data.

Optionally, the intercepted data includes signaling data and traffic data. The traffic data includes uplink and downlink traffic data of the interception target. The signaling data includes at least one of: data on attachment time of the interception target, data on geographical location of the interception target, data on a bearer used by the interception target, a signaling message for the interception target.

Optionally, the interception task carries an address for storing the intercepted data and the transmitting unit is further configured to transmit the intercepted data to the interception proxy, such that the interception proxy forwards the intercepted data to the address.

Optionally, the device further includes: an assigning unit configured to assign, after the small base station has received the interception task, a feature value for each bearer of the interception target, for associating the intercepted data with the corresponding bearer of the interception target; and a transmitting unit configured to transmit the intercepted data carrying the feature value to the interception proxy.

In yet another aspect of the embodiments of the present disclosure, a non-transitory computer readable storage medium is provided. The non-transitory computer readable storage medium stores computer instructions causing a computer to perform the above method for interception based on LBO according to the present disclosure.

In still another aspect of the embodiments of the present disclosure, a computer program product is provided. The computer program product includes a computer program stored on a non-transitory computer readable storage medium. The computer program includes program instructions which, when executed by a computer, cause the computer to perform the above method for interception based on LBO according to the present disclosure.

In a further aspect of the embodiments of the present disclosure, an electronic device is provided. The electronic device includes at least one processor and a memory connected communicatively to the at least one processor. The memory stores instructions executable by the at least one processor for performing the above method for interception based on LBO according to the present disclosure.

With the embodiments of the present disclosure, a small base station receives an interception task instructing the small base station to intercept an interception target. The small base station intercepts LBO data of the interception target based on the interception task to obtain intercepted data. The small base station transmits the intercepted data. In this way, the small base station intercepts the LBO data in an LBO scenario to obtain the intercepted data, such that the problem in the related art that data cannot be intercepted in an LBO scenario can be solved and an effect of intercepting data in the LBO scenario can be achieved.

BRIEF DESCRIPTION OF THE DRAWINGS

The figures described herein are provided for further understanding of the present disclosure, and constitute a part of the present disclosure. The illustrative embodiments of the present disclosure and the descriptions thereof are for explaining the present disclosure, rather than unduly limiting the present disclosure. In the figures.

DETAILED DESCRIPTION

In order to make those skilled in the art better understand the solution of the present disclosure, the technical solutions in the embodiments of the present disclosure are clearly and completely described in the following with reference to the accompanying drawings in the embodiments of the present disclosure. It is apparent that the described embodiments are only part of the embodiments of the present disclosure, but not all of them. All other embodiments obtained by those of ordinary skill in the art based on the embodiments of the present disclosure without any creative effort shall fall within the scope of protection of the present disclosure.

It should be noted that the terms "first," "second," and the like, in the description and claims, as well as the above-mentioned drawings, of the present disclosure are used to distinguish similar objects, but not necessarily used to describe a specific order or precedence order. It should be understood that data used in this way can be interchanged where appropriate so that the embodiments of the present disclosure described herein can be implemented in a sequence other than those illustrated or described herein. The terms "including" and "having" and any variants thereof are intended to cover non-exclusive inclusions. For example, a process, method, system, product, or device that comprises a series of steps or units is not necessarily limited to those steps or units that are clearly listed, but may comprise other steps or units that are not clearly listed or are inherent to such processes, methods, products, or devices.

According to the embodiment of the present disclosure, a method for interception based on LBO is provided. It should be noted that the steps shown in the flowchart of the accompanying drawings can be performed in, for example, a computer system of a group of computer executable instructions. Besides, although a logical sequence is shown in the flowchart, in some cases, the steps shown or described can be performed in an order different from that described herein.

Figure 1:
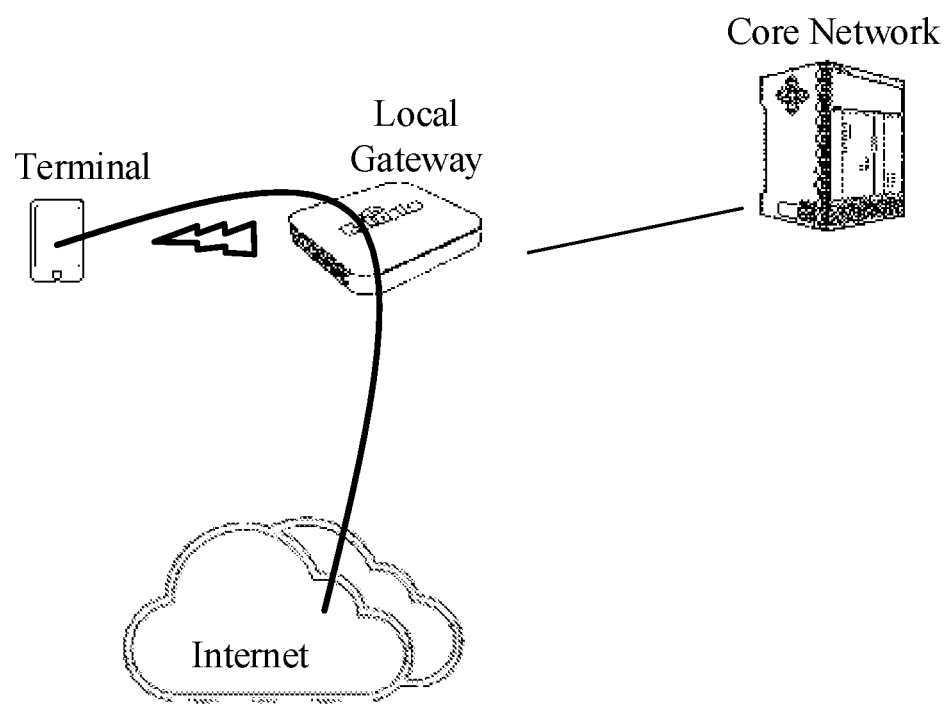
FIG. 1 is a schematic diagram showing a network deployment in an LBO scenario in the related art.
Figure 2:
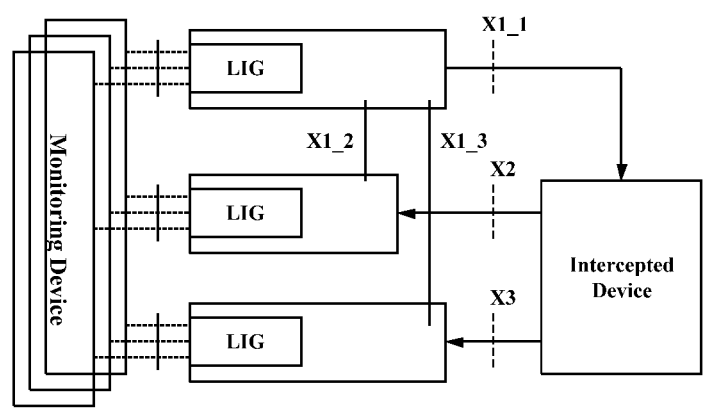
FIG. 2 is a schematic diagram showing an interception architecture in the related art.
Figure 3:
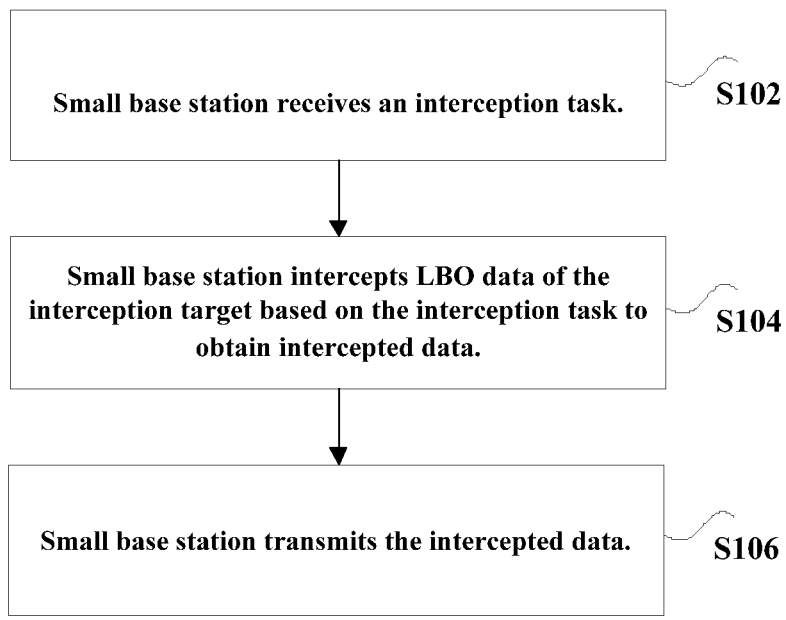
FIG. 3 is a flowchart illustrating a method for interception based on LBO according to an embodiment of the present disclosure.

FIG. 3 is a flowchart illustrating a method for interception based on LBO according to an embodiment of the present disclosure. As shown in FIG. 3, the method includes the following steps.

At step S102, a small base station receives an interception task instructing the small base station to intercept an interception target. The interception task carries interception parameters, including an identifier of the interception target, an IP address and a port number of an X3 interface, and an IP address and a port number of an X2 interface. Here, the identifier of the interception target can be an identifier that uniquely identifies a UE, such as the UE's International Mobile Subscriber Identity (IMSI), Mobile Subscriber ISDN Number (MSISDN), International Mobile station Equipment Identity (IMEI), Network Access Identity (NAI) or IP address.

At step S104, the small base station intercepts LBO data of the interception target based on the interception task to obtain intercepted data. In an LBO scenario, data traffic can bypass a core network device and be offloaded from the small base station directly to the Internet, without being delivered to S-GW, PDN-GW or ePDG. Hence, the LBO data of the interception target can be intercepted at the small location to obtain the intercepted data.

At step S106, the small base station transmits the intercepted data. The small base station can transmit the intercepted data to a default object for processing the intercepted data, e.g., an interception gateway, or to an address carried in the interception task.

In the LBO scenario, data traffic is directly offloaded from the small base station, such that the offloaded traffic cannot be intercepted in a conventional way. With the above embodiment, by intercepting the LBO data at the small base station, the intercepted data can be obtained. In this way, the problem in the related art that data cannot be intercepted in the LBO scenario can be solved, thereby achieving an effect of intercepting data in the LBO scenario.

Optionally, the interception task is transmitted by a core network device or an interception proxy to which the interception target belongs. An interception gateway can transmit the interception task to the core network device or the interception proxy to which the interception target belongs. After receiving the interception task, the core network device transmits it to the small base station. If the interception gateway transmits the interception task to the interception proxy, the interception proxy will forward it to the small base station.

The interception proxy may manage small base stations within an area, transmit the interception task to the small base station within the area it manages, and forward the intercepted data to the interception gateway. The interception proxy can be deployed anywhere and preferably at a core network device (trusted domain). When compared with the scheme in which the core network device transmits the interception task and the intercepted data, the scheme in which the interception proxy forwards the interception task and the intercepted data may save resources at the core network device and require less modification to the core network device.

In the following, the schemes in which the core network device and the interception proxy transmit the interception task and report the intercepted data will be explained respectively.

(1) The core network device transmits the interception task.

Figure 4:
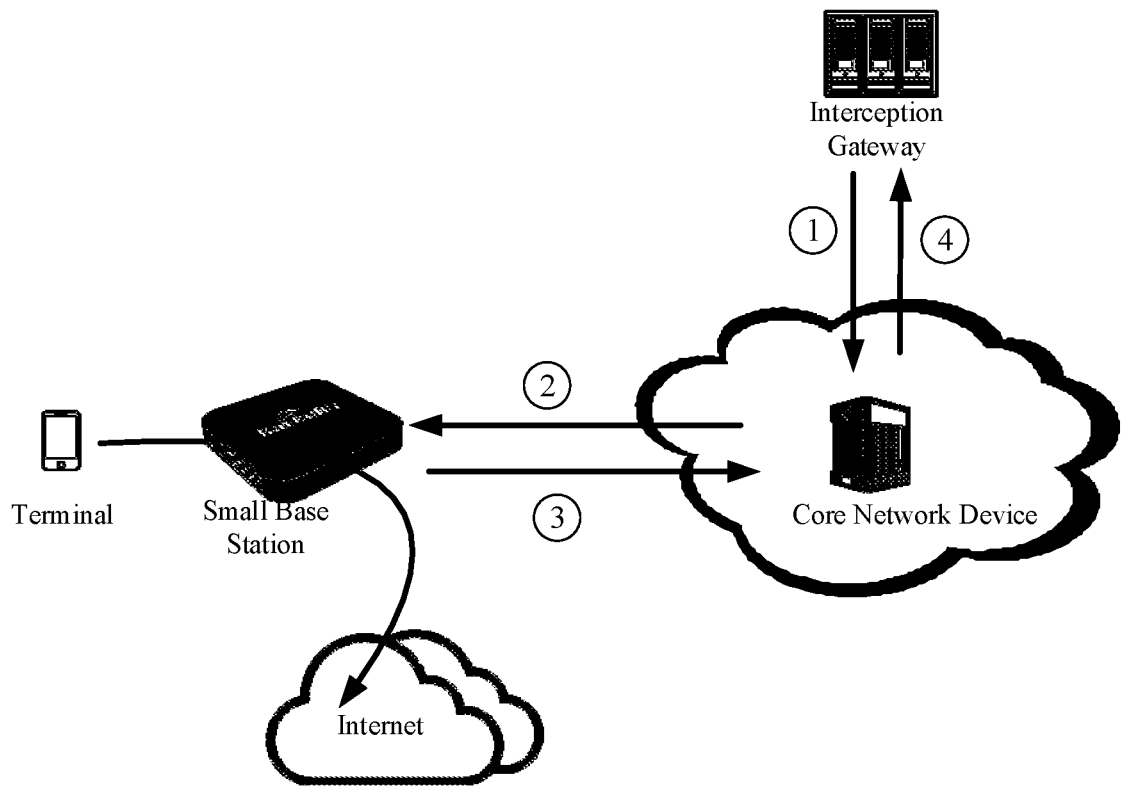
FIG. 4 is a schematic diagram showing a network architecture in which an interception task is transmitted by a core network device according to an embodiment of the present disclosure.

As shown in FIG. 4, a terminal transmits traffic data via a small base station in an LBO scenario. It can be seen from FIG. 4 that the data of the terminal is transmitted directly via the small base station without passing through the core network. Hence, the small base station can intercept the LBO data.

(1) The interception gateway notifies the core network device to intercept the interception target. The notification carries an identifier of the interception target.

(2) The core network device transmits an interception task to the small base station. The core network device determines whether the interception target is a UE in an LBO scenario by means of UE identifier matching. If so, the core network device transmits an interception task to the small base station; or otherwise it performs the interception itself. Here, the core network device assigns a feature value (correlation number) for each bearer of the interception target, for associating the intercepted data with the corresponding bearer of the interception target. The core network device generates the interception task from formation including the generated feature value and the identifier of the interception target for transmitting to the small base station. Meanwhile, the core network device also generates a response message for reporting to the interception gateway.

(3) The small base station intercepts the interception target based on the interception task and transmits the intercepted data to the core network device. The small base station establishes a dedicated transmission channel with the core network device for transmission of the data intercepted by the small base station. The base station intercepts the LBO data of the interception target and transmits the intercepted data via the dedicated transmission channel.

(4) The core network device forwards the intercepted device to the interception gateway. In addition to the intercepted data, the core network device can also transmit a signaling message to the interception gateway, e.g., to notify the interception gateway that the interception has begun, continued or ended.

Figure 5:
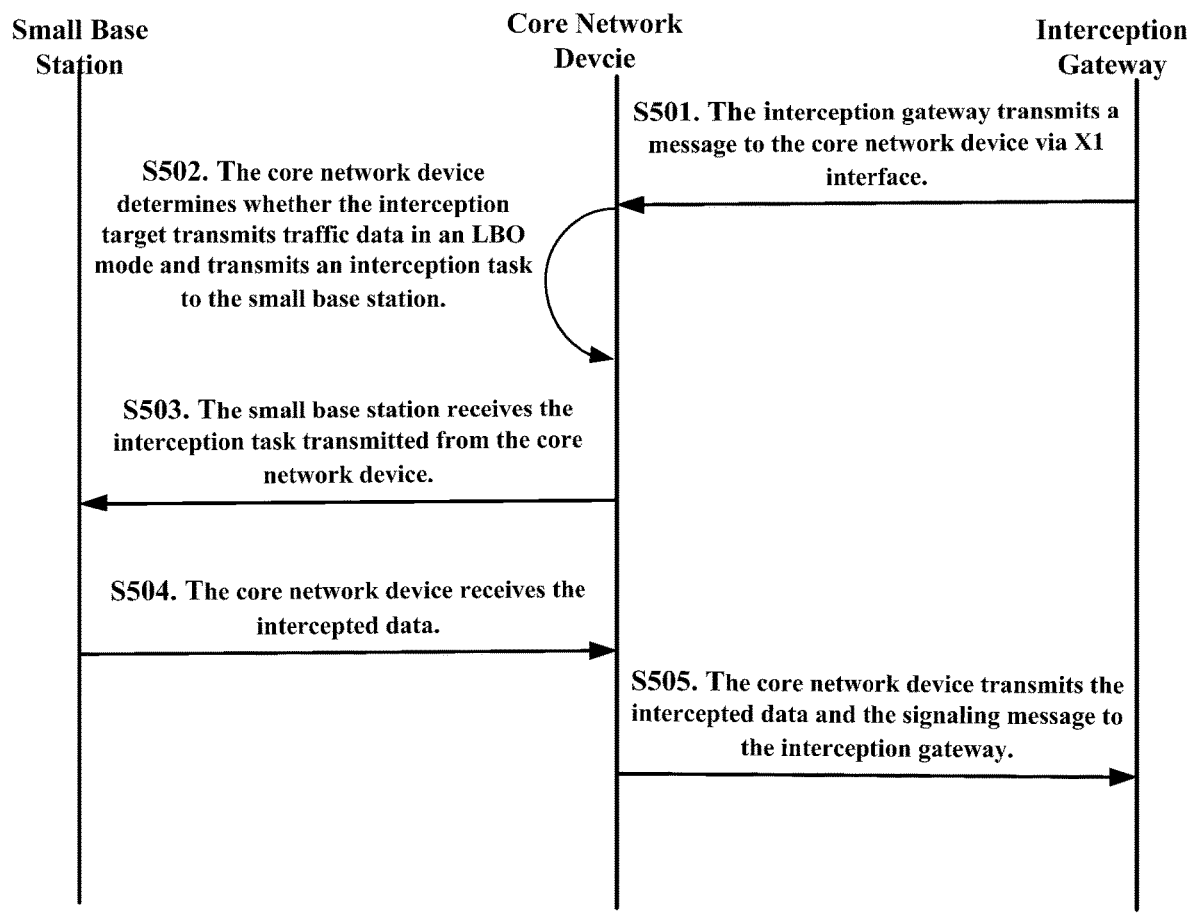
FIG. 5 is a schematic diagram showing interactions in a method for data interception in which an interception task is transmitted by a core network device according to an embodiment of the present disclosure.

The following description will be given with reference to the interactions shown in FIG. 5.

At S501, the interception gateway transmits a message to the core network device via an X1 interface, notifying the core network device to intercept the interception target NAI01.

At S502, the core network device determines whether the interception target NAI01 transmits traffic data in an LBO mode. If so, it transmits an interception task to the small base station. The core network device parses the message transmitted from the interception gateway to obtain interception parameters, including an identifier NAI01 of the interception target, an IP address of an X2 interface IPX2, and an IP address of an X3 interface IPX3. The core network device learns that the interception target NAI01 has four bearers and assigns a feature value to each of the bearers, i.e., CZ1, CZ2, CZ3 and CZ4.

The core network device transmits the identifier NAI01 of the interception target, the respective feature values of the four bearers, CZ1, CZ2, CZ3 and CZ4, to the small base station.

Meanwhile, the core network device generates a signaling message, e.g., X2 IRI_BEGIN, for reporting that the interception for NAI01 has begun.

At S503, the small base station receives the interception task transmitted from the core network device and establishes a dedicated transmission channel with the core network device for transmitting the intercepted data obtained by intercepting NAI01 to the core network device. For example, there may be a video data transmission between the interception target NAI01 and Terminal B. The uplink and downlink video data for the interception target NAI01 can be intercepted in the LBO scenario. The small base station intercepts data over each bearer of the interception target and adds the corresponding feature value to the intercepted data for each bearer. When the video data is intercepted over the four bearers, the intercepted data transmitted to the core network device can include: Video Data 1_CZ1_NAI01, Video Data 2_CZ2_NAI01, Video Data 3_CZ3_NAI01 and Video Data 4_CZ4_NAI01. When a bearer is added or modified, the feature value of the corresponding bearer changes, so as to keep track of the intercepted data.

At S504, the core network device receives the intercepted data, encapsulates the received video data in a message format defined for the X3 interface and encapsulates a signaling message in a message format defined for the X2 interface. The signaling message may include: a geographical location of the interception target NAI01 (the location is reported to the interception gateway each time it moves from one base station to another), time at which the interception target NAI01 begins to transmit chatting data, time at which the interception target NAI01 stops transmitting the chatting data, information on bandwidth for transmission of the video data between the interception target NAI01 and Terminal B (the number of bearers used for transmission of the chatting data between the interception target NAI01 and Terminal B, each bearer having QoS properties including bandwidth information). The signaling message may carry the feature value of each bearer, e.g., a signaling message X2 IRI_Begintime10:00_CZ2_NAI01 for notifying the interception gateway of the time at which NAI01 begins to transmit the chatting data, or a signaling message indicating that the interception has continued or ended.

At S505, the core network device transmits the intercepted data and the signaling message to the interception gateway. It is to be noted that the specific formats of the intercepted data and signaling message are only for the purpose of illustrating what data is transmitted by the core network device and what content is carried by the transmitted data. This embodiment is not limited to those formats. Any messages encapsulated in any format defined for the X2 and X3 interfaces can be used in this embodiment.

With the above embodiment, the small base station intercepts the interception target based on the interception task transmitted by the core network and transmits the intercepted data to the core network for forwarding to the interception gateway. In this way, the interception target can be intercepted in the LBO mode, such that the problem in the related art that the interception target cannot be intercepted in the LBO mode can be solved. Furthermore, each bearer of the small base station corresponds to a feature value which is transmitted to the interception gateway along with the intercepted data, such that the interception gateway can analyze the intercepted data for each bearer.

(2) The interception proxy transmits the interception task.

Figure 6:
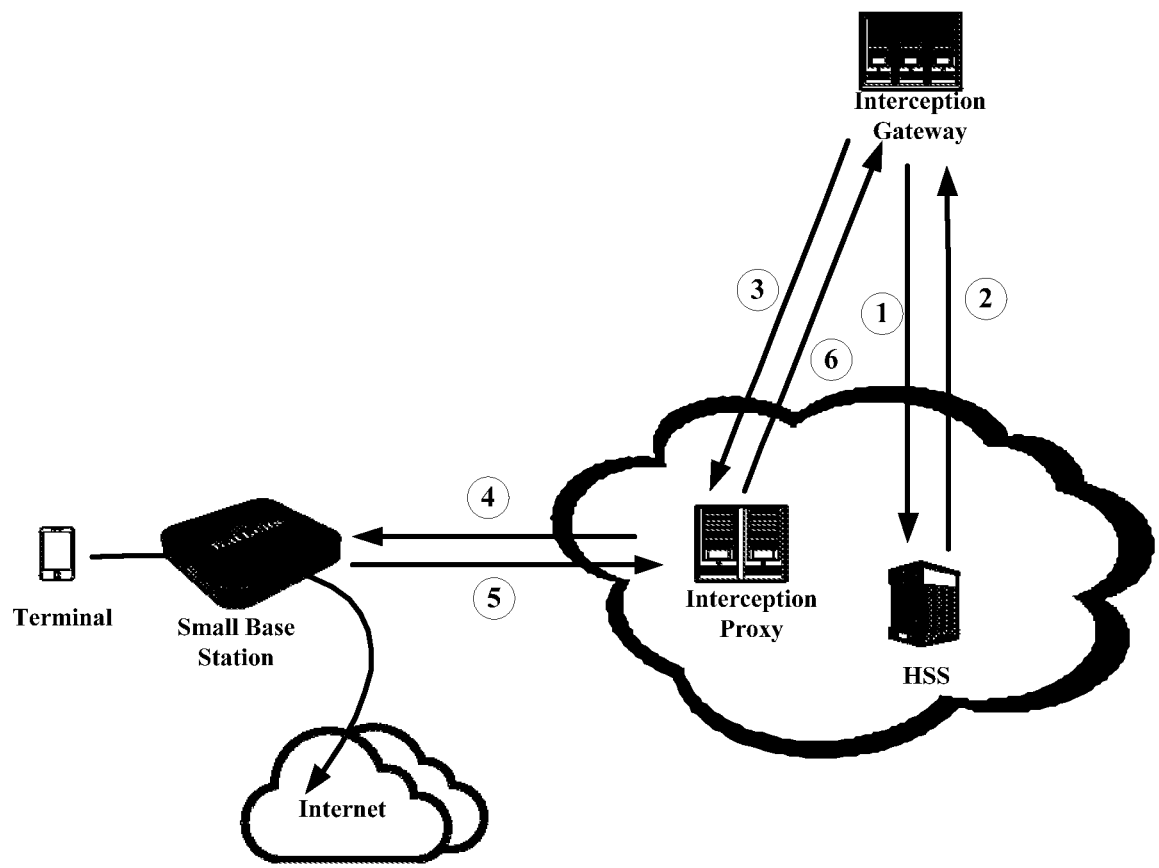
FIG. 6 is a schematic diagram showing a network architecture in which an interception task is transmitted by an interception proxy according to an embodiment of the present disclosure.

As shown in FIG. 6, the interception gateway transmits to the interception proxy a notification to intercept the interception target and the interception proxy transmits the interception task to the small base station. After the small base station has intercepted data, the interception proxy forwards the intercepted data. The interception proxy is preferably, but not limited to be, located in the core network device. When compared with the scheme in which the core network device forwards the intercepted data, the scheme in which the interception proxy forwards the data may save resources at the core network device. In this way, the core network device may focus on its communication functions, without allocating excessive resources for the interception, which has less modifications to the core network device and the functions thereof.

(1) The interception gateway requests a Home Subscriber Server (HSS) to inquire about the interception proxy to which the interception target belongs. The interception proxy can transmit an interception task for at least one interception target.

(2) The HSS returns an identifier of the interception proxy to which the interception target belongs to the interception gateway. The identifier can be an IP address or domain name of the interception proxy.

(3) After obtaining the identifier of the interception proxy, the interception gateway transmits to the corresponding interception proxy a notification to monitor the interception target, notifying the interception proxy to intercept the interception target. The notification may carry interception parameters, including an identifier of the interception target, an IP address and a port number of an X2 interface, and an IP address and a port number of an X3 interface.

(4) The interception proxy generates an interception task which may carry the identifier of the interception target and an address and port number of the interception proxy. The interception proxy transmits the interception task to a small base station it manages.

(5) The small base station receives the interception task generated by the interception to which the interception target belongs based on the interception request from the interception gateway. The small base station intercepts the interception target based on the identifier of the interception target carried in the interception task, and transmits the intercepted data to the interception proxy.

Upon receiving the interception task, the small base station obtains the identifier of the interception target. The identifier of the interception target can be an identifier that uniquely identifies a UE, such as the UE's International Mobile Subscriber Identity (IMSI), Mobile Subscriber ISDN Number (MSISDN), International Mobile station Equipment Identity (IMEI), Network Access Identity (NAI) or IP address. Alternatively, it can be an identifier regenerated by the interception proxy and recognizable by the small base station. The small base station assigns a feature value for each bearer of the interception target and transmits the feature value along with the intercepted data. The feature value is used for associating the intercepted data with the corresponding bearer of the interception target. The small base station can transmit signaling data and traffic data to the interception proxy. The traffic data may include uplink and downlink traffic data of the interception target and the signaling data may include at least one of: data on attachment time of the interception target, data on geographical location of the interception target, data on a bearer used by the interception target, a signaling message for the interception target.

The signaling data can be encapsulated in a format defined for the X2 interface for transmission to the interception proxy. The traffic data can be encapsulated in a format defined for the X3 interface. When the traffic data is transmitted, a corresponding feature value is added to the data transmitted over each bearer.

(6) The interception proxy forwards the intercepted data transmitted from the base station to the interception gateway or to an address which the interception gateway instructs the interception proxy to transmit the intercepted data to.

Figure 7:
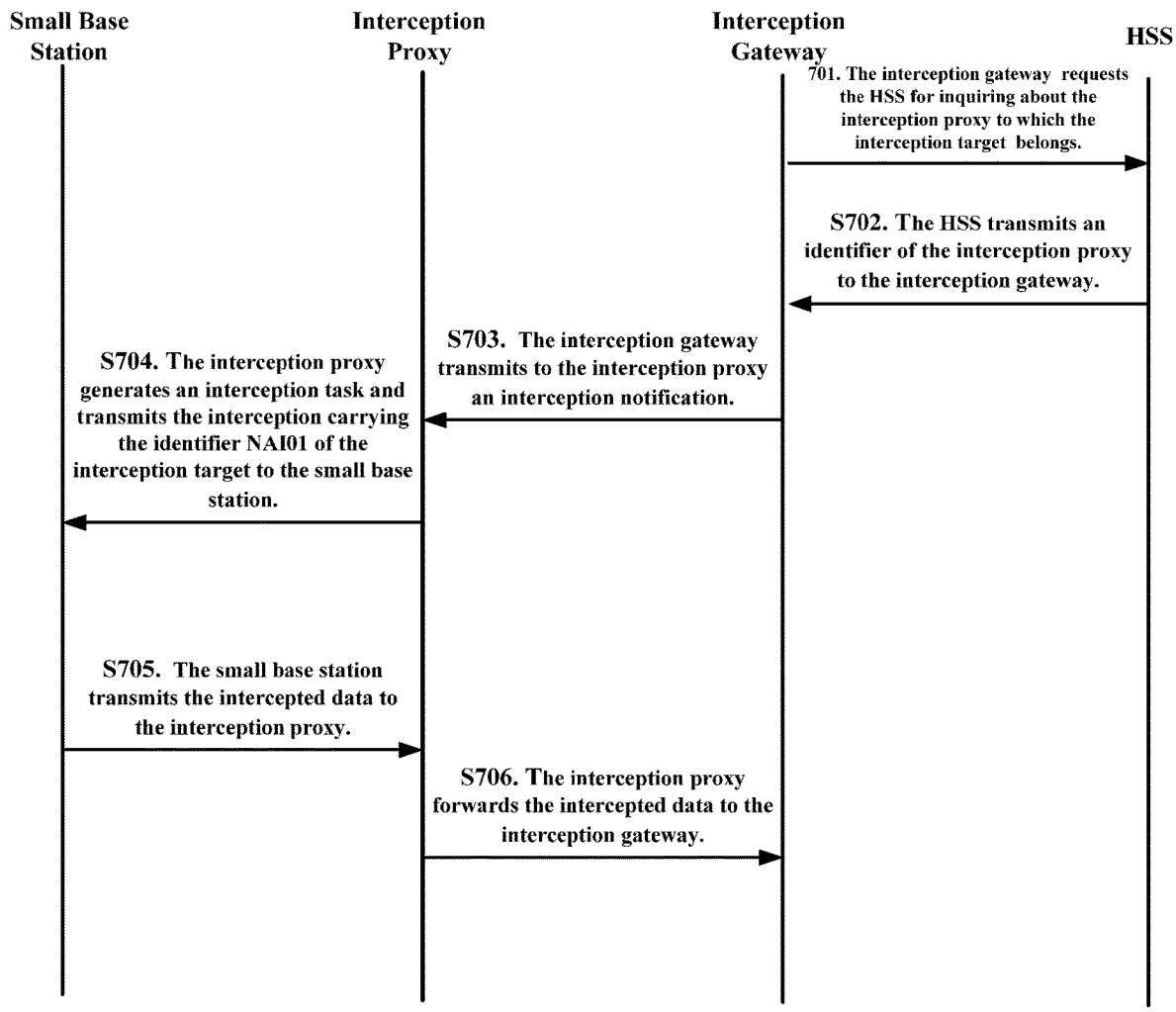
FIG. 7 is a schematic diagram showing interactions in a method for data interception in which an interception task is transmitted by an interception proxy according to an embodiment of the present disclosure.

This embodiment will be explained with reference to the interactions shown in FIG. 7.

At S701, the interception gateway transmits a request to the HSS for inquiring about the interception proxy to which the interception target NAI01 belongs.

At S702, the HSS transmits an identifier, P01, of the interception proxy to the interception gateway.

At S703, the interception gateway transmits to the interception proxy P01 an interception notification carrying the identifier NAI01 of the interception target. The notification may further carry an IP address and a port number of an X2 interface, and an IP address and a port number of an X3 interface.

At S704, the interception proxy generates an interception task and transmits the interception carrying the identifier NAI01 of the interception target to the small base station. That is, the interception gateway transmits an inquiry request to the HSS for inquiring the interception proxy to which the interception target NAI01 belongs. The interception gateway receives the interception proxy and transmits an interception request to the interception proxy, such that the interception proxy can generate the interception task based on the interception request.

At S705, the small base station transmits the intercepted data to the interception proxy. The small base station can obtain from the interception task the identifier NAI01 of the interception target and the identifier of the interception proxy P01 (or the IP address and port number of the interception proxy). The small base station generates a feature value for each bearer of the interception target NAI01 and intercepts uplink/downlink data of the interception target NAI01. For example, there may be a video data transmission between the interception target NAI01 and Terminal B. The uplink and downlink video data for the interception target NAI01 can be intercepted in the LBO scenario. The small base station intercepts data over each bearer of the interception target and adds the corresponding feature value to the intercepted data for each bearer. When the video data is intercepted over the four bearers, the intercepted data transmitted to the interception proxy can include: Video Data 1_CZ1_NAI01, Video Data 2_CZ2_NAI01, Video Data 3_CZ3_NAI01 and Video Data 4_CZ4_NAI01.

The small base station encapsulates the received video data in a message format defined for the X3 interface and encapsulates a signaling message in a message format defined for the X2 interface. The signaling message may include: a geographical location of the interception target NAI01 (the location is reported to the interception gateway each time it moves from one base station to another), time at which the interception target NAI01 begins to transmit chatting data, time at which the interception target NAI01 stops transmitting the chatting data, information on bandwidth for transmission of the video data between the interception target NAI01 and Terminal B (the number of bearers used for transmission of the chatting data between the interception target NAI01 and Terminal B, each bearer having QoS properties including bandwidth information). The signaling message may carry the feature value of each bearer, e.g., a signaling message X2 IRI_Begintime10:00_CZ2_NAI01 for notifying the interception gateway of the time at which NAI01 begins to transmit the chatting data, or a signaling message indicating that the interception has continued or ended. It is to be noted that the specific formats of the intercepted data and signaling message are only for the purpose of illustrating what data is transmitted by the small base station and what content is carried by the transmitted data. This embodiment is not limited to those formats. Any messages encapsulated in any format defined for the X2 and X3 interfaces can be used in this embodiment. When the data is encapsulated, bearer information can be carried and additional information such as a timestamp can also be carried, such that data analysis can be applied to the intercepted data.

At S706, the interception proxy forwards the intercepted data to the interception gateway. The interception proxy can forward the intercepted data transmitted from the small base station to the interception gateway. The interception proxy can transmit the intercepted data based on the interface address and port number in the notification transmitted from the interception gateway.

When a bearer is added or modified, the feature value of the corresponding bearer changes accordingly. The small base station can generate a new features value for a new bearer, so as to keep track of the intercepted data. The other steps are the same as those described above and details thereof will be omitted here.

With the above embodiment, the interception target can be intercepted in the LBO scenario. The small base station intercepts the uplink and downlink data over each bearer of the interception target and transmits the signaling message to the interception gateway, notifying the interception gateway that the current interception has begun, continued or ended. With the interception proxy forwarding the intercepted data and transmitting the interception task, resources used by the core network device in the interception process can be reduced and excessive modifications and settings for the core network device can be avoided.

It is to be noted that the wireless communication technologies described in the embodiments of the present disclosure can include, but not limited to, WCDMA, CDMA2000, TD-SCDMA, WiMAX, LTE/LTE-A and the $5^{th}$, $6^{th}$, . . . , N-th generations of mobile communication technologies in the future, or wireless communication technologies such as WiFi, BLUETOOTH® or infrared. For the purpose of simplicity, the embodiments of the present disclosure are described with reference to the $4^{th}$ generation of mobile communication technologies such as LTE/LTE-A for example. In this case, the interception target can be a mobile communication terminal and the small base station is a representative of access devices.

Figure 8:
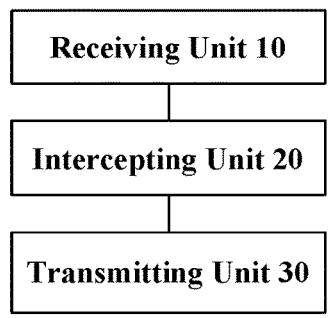
FIG. 8 is a schematic diagram of a device for interception based on LBO according to an embodiment of the present disclosure.

According to an embodiment of the present disclosure, a device for interception based on LBO is provided. As shown in FIG. 8, the device for interception based on LBO includes a receiving unit 10, an intercepting unit 20 and a transmitting unit 30.

The receiving unit 10 is configured to receive an interception task instructing a small base station to intercept an interception target. The interception task carries interception parameters, including an identifier of the interception target, an IP address and a port number of an X3 interface, and an IP address and a port number of an X2 interface. Here, the identifier of the interception target can be an identifier that uniquely identifies a UE, such as the UE's International Mobile Subscriber Identity (IMSI), Mobile Subscriber ISDN Number (MSISDN), International Mobile station Equipment Identity (IMEI), Network Access Identity (NAI) or IP address.

The intercepting unit 20 is configured to intercept LBO data of the interception target based on the interception task to obtain intercepted data. In an LBO scenario, data traffic can bypass a core network device and be offloaded from the small base station directly to the Internet, without being delivered to S-GW, PDN-GW or ePDG. Hence, the LBO data of the interception target can be intercepted at the small location to obtain the intercepted data.

The transmitting unit 30 is configured to transmit the intercepted data. The small base station can transmit the intercepted data to a default object for processing the intercepted data, e.g., an interception gateway, or to an address carried in the interception task.

In the LBO scenario, data traffic is directly offloaded from the small base station, such that the offloaded traffic cannot be intercepted in a conventional way. With the above embodiment, by intercepting the LBO data at the small base station, the intercepted data can be obtained. In this way, the problem in the related art that data cannot be intercepted in the LBO scenario can be solved, thereby achieving an effect of intercepting data in the LBO scenario.

Optionally, the interception task is transmitted by a core network device and the receiving unit includes: a receiving module configured to receive the interception task generated by the core network device based on an interception request from an interception gateway. The interception task carries a feature value generated by the core network device for each bearer of the interception target for associating the intercepted data with the corresponding bearer of the interception target.

The interception proxy may manage small base stations within an area, transmit the interception task to the small base station within the area it manages, and forward the intercepted data to the interception gateway. The interception proxy can be deployed anywhere and preferably at a core network device (trusted domain). When compared with the scheme in which the core network device transmits the interception task and the intercepted data, the scheme in which the interception proxy forwards the interception task and the intercepted data may save resources at the core network device and require less modifications to the core network device.

In the following, the schemes in which the core network device and the interception proxy transmit the interception task and report the intercepted data will be explained respectively.

(1) The core network device transmits the interception task.

As shown in FIG. 4, a terminal transmits traffic data via a small base station in an LBO scenario. It can be seen from FIG. 4 that the data of the terminal is transmitted directly via the small base station without passing through the core network. Hence, the small base station can intercept the LBO data.

The core network device forwards the intercepted device to the interception gateway. In addition to the intercepted data, the core network device can also transmit a signaling message to the interception gateway, e.g., to notify the interception gateway that the interception has begun, continued or ended.

Optionally, the transmitting unit includes: an establishing module configured to establish an intercepted data transmission channel for transmission of the intercepted data between the small base station and the core network device; and a transmitting module configured to transmit the intercepted data to the core network device via the intercepted data transmission channel.

Optionally, the transmitting unit is further configured to transmit uplink and downlink traffic data of the interception target.

The following description will be given with reference to the interactions shown in FIG. 5.

At S501, the interception gateway transmits a message to the core network device via an X1 interface, notifying the core network device to intercept the interception target NAI01.

At S502, the core network device determines whether the interception target NAI01 transmits traffic data in an LBO mode. If so, it transmits an interception task to the small base station. The core network device parses the message transmitted from the interception gateway to obtain interception parameters, including an identifier NAI01 of the interception target, an IP address of an X2 interface IPX2, and an IP address of an X3 interface IPX3. The core network device learns that the interception target NAI01 has four bearers and assigns a feature value to each of the bearers, i.e., CZ1, CZ2, CZ3 and CZ4.

The core network device transmits the identifier NAI01 of the interception target, the respective feature values of the four bearers, CZ1, CZ2, CZ3 and CZ4, to the small base station.

Meanwhile, the core network device generates a signaling message, e.g., X2 IRI_BEGIN, for reporting that the interception for NAI01 has begun.

At S503, the small base station receives the interception task transmitted from the core network device and establishes a dedicated transmission channel with the core network device for transmitting the intercepted data obtained by intercepting NAI01 to the core network device. For example, there may be a video data transmission between the interception target NAI01 and Terminal B. The uplink and downlink video data for the interception target NAI01 can be intercepted in the LBO scenario. The small base station intercepts data over each bearer of the interception target and adds the corresponding feature value to the intercepted data for each bearer. When the video data is intercepted over the four bearers, the intercepted data transmitted to the core network device can include: Video Data 1_CZ1_NAI01, Video Data 2_CZ2_NAI01, Video Data 3_CZ3_NAI01 and Video Data 4_CZ4_NAI01. When a bearer is added or modified, the feature value of the corresponding bearer changes, so as to keep track of the intercepted data.

At S504, the core network device receives the intercepted data, encapsulates the received video data in a message format defined for the X3 interface and encapsulates a signaling message in a message format defined for the X2 interface. The signaling message may include: a geographical location of the interception target NAI01 (the location is reported to the interception gateway each time it moves from one base station to another), time at which the interception target NAI01 begins to transmit chatting data, time at which the interception target NAI01 stops transmitting the chatting data, information on bandwidth for transmission of the video data between the interception target NAI01 and Terminal B (the number of bearers used for transmission of the chatting data between the interception target NAI01 and Terminal B, each bearer having QoS properties including bandwidth information). The signaling message may carry the feature value of each bearer, e.g., a signaling message X2 IRI_Begintime10:00_CZ_NAI01 for notifying the interception gateway of the time at which NAI01 begins to transmit the chatting data, or a signaling message indicating that the interception has continued or ended.

At S505, the core network device transmits the intercepted data and the signaling message to the interception gateway. It is to be noted that the specific formats of the intercepted data and signaling message are only for the purpose of illustrating what data is transmitted by the core network device and what content is carried by the transmitted data. This embodiment is not limited to those formats. Any messages encapsulated in any format defined for the X2 and X3 interfaces can be used in this embodiment.

With the above embodiment, the small base station intercepts the interception target based on the interception task transmitted by the core network and transmits the intercepted data to the core network for forwarding to the interception gateway. In this way, the interception target can be intercepted in the LBO mode, such that the problem in the related art that the interception target cannot be intercepted in the LBO mode can be solved. Furthermore, each bearer of the small base station corresponds to a feature value which is transmitted to the interception gateway along with the intercepted data, such that the interception gateway can analyze the intercepted data for each bearer.

(2) The interception proxy transmits the interception task.

As shown in FIG. 6, the interception gateway transmits to the interception proxy a notification to intercept the interception target and the interception proxy transmits the interception task to the small base station. After the small base station has intercepted data, the interception proxy forwards the intercepted data. The interception proxy is preferably, but not limited to be, located in the core network device. When compared with the scheme in which the core network device forwards the intercepted data, the scheme in which the interception proxy forwards the data may save resources at the core network device. In this way, the core network device may focus on its communication functions, without allocating excessive resources for the interception, which has less modifications to the core network device and the functions thereof.

Optionally, the interception task is transmitted by an interception proxy to which the interception target belongs. The receiving unit is further configured to receive the interception task generated by the interception proxy to which the interception target belongs based on an interception request from an interception gateway. The transmitting unit is further configured to transmit the intercepted data to the interception proxy, such that the interception proxy can forward the intercepted data.

Optionally, the intercepted data includes signaling data and traffic data. The traffic data includes uplink and downlink traffic data of the interception target. The signaling data includes at least one of: data on attachment time of the interception target, data on geographical location of the interception target, data on a bearer used by the interception target, a signaling message for the interception target.

Optionally, the interception task carries an address for storing the intercepted data and the transmitting unit is further configured to transmit the intercepted data to the interception proxy, such that the interception proxy can forward the intercepted data to the address.

Optionally, the device further includes: an assigning unit configured to assign, after the small base station has received the interception task, a feature value for each bearer of the interception target, for associating the intercepted data with the corresponding bearer of the interception target; and a transmitting unit configured to transmit the intercepted data carrying the feature value to the interception proxy.

This embodiment will be explained with reference to the interactions shown in FIG. 7.

At S701, the interception gateway transmits a request to the HSS for inquiring about the interception proxy to which the interception target NAI01 belongs.

At S702, the HSS transmits an identifier, P01, of the interception proxy to the interception gateway.

At S703, the interception gateway transmits to the interception proxy P01 an interception notification carrying the identifier NAI01 of the interception target. The notification may further carry an IP address and a port number of an X2 interface, and an IP address and a port number of an X3 interface.

At S704, the interception proxy generates an interception task and transmits the interception carrying the identifier NAI01 of the interception target to the small base station. That is, the interception gateway transmits an inquiry request to the HSS for inquiring the interception proxy to which the interception target NAI01 belongs. The interception gateway receives the interception proxy and transmits an interception request to the interception proxy, such that the interception proxy can generate the interception task based on the interception request.

At S705, the small base station transmits the intercepted data to the interception proxy. The small base station can obtain from the interception task the identifier NAI01 of the interception target and the identifier P01 of the interception proxy (or the IP address and port number of the interception proxy). The small base station generates a feature value for each bearer of the interception target NAI01 and intercepts uplink/downlink data of the interception target NAI01. For example, there may be a video data transmission between the interception target NAI01 and Terminal B. The uplink and downlink video data for the interception target NAI01 can be intercepted in the LBO scenario. The small base station intercepts data over each bearer of the interception target and adds the corresponding feature value to the intercepted data for each bearer. When the video data is intercepted over the four bearers, the intercepted data transmitted to the interception proxy can include: Video Data 1_CZ1_NAI01, Video Data 2_CZ2_NAI01, Video Data 3_CZ3_NAI01 and Video Data 4_CZ4_NAI01.

The small base station encapsulates the received video data in a message format defined for the X3 interface and encapsulates a signaling message in a message format defined for the X2 interface. The signaling message may include: a geographical location of the interception target NAI01 (the location is reported to the interception gateway each time it moves from one base station to another), time at which the interception target NAI01 begins to transmit chatting data, time at which the interception target NAI01 stops transmitting the chatting data, information on bandwidth for transmission of the video data between the interception target NAI01 and Terminal B (the number of bearers used for transmission of the chatting data between the interception target NAI01 and Terminal B, each bearer having QoS properties including bandwidth information). The signaling message may carry the feature value of each bearer, e.g., a signaling message X2 IRI_Begintime10:00_CZ2_NAI01 for notifying the interception gateway of the time at which NAI01 begins to transmit the chatting data, or a signaling message indicating that the interception has continued or ended. It is to be noted that the specific formats of the intercepted data and signaling message are only for the purpose of illustrating what data is transmitted by the small base station and what content is carried by the transmitted data. This embodiment is not limited to those formats. Any messages encapsulated in any format defined for the X2 and X3 interfaces can be used in this embodiment. When the data is encapsulated, bearer information can be carried and additional information such as a timestamp can also be carried, such that data analysis can be applied to the intercepted data.

At S706, the interception proxy forwards the intercepted data to the interception gateway. The interception proxy can forward the intercepted data transmitted from the small base station to the interception gateway. The interception proxy can transmit the intercepted data based on the interface address and port number in the notification transmitted from the interception gateway.

When a bearer is added or modified, the feature value of the corresponding bearer changes accordingly. The small base station can generate a new features value for a new bearer, so as to keep track of the intercepted data. The other steps are the same as those described above and details thereof will be omitted here.

With the above embodiment, the interception target can be intercepted in the LBO scenario. The small base station intercepts the uplink and downlink data over each bearer of the interception target and transmits the signaling message to the interception gateway, notifying the interception gateway that the current interception has begun, continued or ended. With the interception proxy forwarding the intercepted data and transmitting the interception task, resources used by the core network device in the interception process can be reduced and excessive modifications and settings for the core network device can be avoided.

According to an embodiment, a non-transitory computer readable storage medium is also provided. The non-transitory computer readable storage medium stores computer instructions causing a computer to execute the method according to any of the above method embodiments of the present disclosure.

According to an embodiment, a computer program product is also provided. The computer program product includes a computer program stored on a non-transitory computer readable storage medium. The computer program includes program instructions which, when executed by a computer, cause the computer to execute the method according to any of the above method embodiments of the present disclosure.

Figure 9:
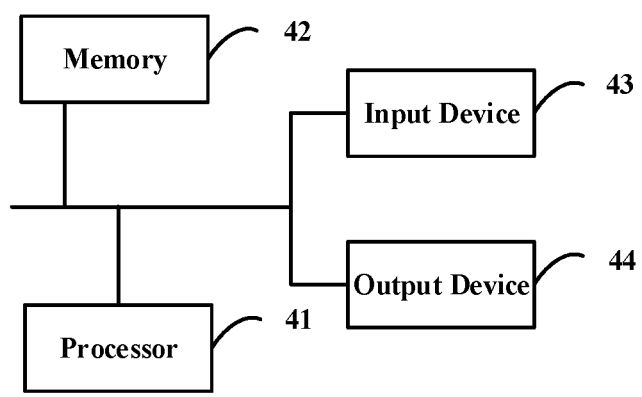
FIG. 9 is a schematic diagram showing a hardware structure of an electronic device in which a method for interception based on LBO can be applied according to an embodiment of the present disclosure.

FIG. 9 is a schematic diagram showing a hardware structure of an electronic device that performs the method for interception based on LBO according to an embodiment. As shown in FIG. 9, the electronic device includes one or more processors 41 and a memory 42. FIG. 9 illustrates one processor 41 as an example.

The electronic device can further include an input device 43 and an output device 44.

The processor 41, the memory 42, the input device 43 and the output device 44 can be connected via a bus or by other means. FIG. 9 illustrates a bus connection as an example.

As a non-transitory computer readable storage medium, the memory 42 can be configured to store a non-transitory software program, a non-transitory computer executable program and modules, for example, program instructions/modules (for example, the receiving unit 10, intercepting unit 20 and transmitting unit 30 as shown in FIG. 8) corresponding to the method for interception based on LBO in the embodiment of the present disclosure. The processor 41 executes various functional applications and data processing of a server through running of the non-transitory software program, instruction and module stored in the memory 42. In this way, the method for interception based on LBO in the above embodiment can be executed.

The memory 42 can include a program memory area and a data memory area. The program memory area can store an operating system and an application program required by at least one function. The data memory area can store data that are created in accordance with application of the device for interception based on LBO. Moreover, the memory 42 can include a high-speed random access memory, and can further include a non-transitory memory, such as at least one disk memory, a flash memory or other non-transitory solid-state memories. In some embodiments, the memory 42 can include memories which are remotely disposed relative to the processor 41. These remote memories can be connected to the device for interception based on LBO through networks which include but are not limited to Internet, Intranet, local area network, mobile radio communications and a combination thereof.

The input device 43 can receive input digital or character information and generate key signal inputs relevant to user settings and functional control of the device for interception based on LBO. The output device 44 can include a display device such as a display screen.

The one or more modules are stored in the memory 42. The modules, when executed by one or more processors 41, perform the method for interception based on LBO in any of the above method embodiments.

The above product can execute the method provided by the embodiment of the present disclosure and have corresponding functional modules and beneficial effects for executing the method. For the technical details not described in the present embodiment, reference can be made to the method provided by the embodiment of the present disclosure.

The electronic device provided by the embodiment of the present disclosure can be embodied in various forms, including but not limited to the following:

(1) Mobile communication equipment: those having the feature of a mobile communication function and the main object of providing voice and data communication, and including a smart phone (e.g., iPhone), a multimedia mobile phone, a functional mobile phone, a low-end mobile phone, etc.

(2) Ultra-mobile personal computer equipment: those belonging to personal computers, having computing and processing functions, generally having a mobile Internet access feature and including PDAs, MIDs, UMPCs, etc., for example, an iPAD®.

(3) Portable recreation equipment: those being capable of displaying and broadcasting multimedia content and including audio and video players (e.g., an iPOD®), a hand-held game player, an e-book, intelligent toys and portable vehicle-mounted navigation equipment.

(4) Servers: those providing computing service and including a processor, a hard disk, an internal memory, a system bus, etc., having a similar architecture to a universal computer and placing higher demands on the processing capability, the stability, the reliability, the security, the expandability, the manageability, etc., due to the need for providing high-reliability services.

(5) Other electronic devices with data interaction functions.

The serial numbers of the embodiments of the present disclosure are merely for description, and do not represent the advantages and disadvantages of the embodiments.

In the above-mentioned embodiments of the present disclosure, the descriptions of the embodiments have their respective emphases. For the parts that are not detailed in a certain embodiment, reference can be made to the related descriptions of other embodiments.

It should be understood that in the embodiments provided by the present disclosure, the disclosed technical contents can be achieved by other means. The device embodiments described above are merely schematic. For example, the partitioning of the units can be a logical functional partitioning. There may be other partitioning modes during actual implementation. For example, multiple units or components can be combined or integrated into another system, or some features can be ignored or not executed. In addition, mutual coupling or direct coupling or communication connection that is shown or discussed can be indirect coupling or communication connection through some interfaces, units or modules, and can be in electrical or other forms.

The units described as separate components may or may not be physically separated, and the components for unit display may or may not be physical units, that is, may be located in one place or distributed on a plurality of units. Part or all of the units can be selected according to actual needs to achieve the object of the solutions of the embodiments.

In addition, all functional units in the embodiments of the present disclosure can be integrated into one processing unit. Or, each unit exists physically independently. Or, two or more units can be integrated into one unit. The above integrated units can be embodied in the form of hardware or a software functional unit.

The integrated units, if embodied in the form of the software functional unit and sold or used as a standalone product, can be stored in a computer readable storage medium. Based on such understanding, the technical solution of the present disclosure in essence, or a part that contributes to the related art, or all or part of the technical solution, can be embodied in the form of a software product. The computer software product is stored in a storage medium and includes a plurality of instructions for a computer device (which can be a personal computer, a server, a network device or the like) to perform all or part of the steps of the method described in the embodiments of the present disclosure. The foregoing storage medium includes: a USB flash disk, a Read-Only Memory (ROM), a Random Access Memory (RAM), a removable hard disk, a magnetic disk, an optical disk, or other various media that can store program codes.

The above description merely describes preferable implementations of the present disclosure, and it should be noted that those skilled in the art can also make various improvements and modifications without departing from the principle of the present disclosure. These improvements and modifications should be considered to be within the scope of protection of the present disclosure.

What is claimed is:

1. A method for interception based on Local Break Out (LBO), comprising:
   receiving, by a small base station, an interception task generated by a core network device based on an interception request from an interception gateway and instructing the small base station to intercept an interception target, the interception task carrying a feature value;
   intercepting, by the small base station, LBO data of the interception target based on the interception task to obtain intercepted data;
   associating, by the small base station, the intercepted data with a corresponding bearer of the interception target for each bearer of the interception target utilizing the feature value; and
   transmitting, by the small base station, the intercepted data to the core network device.

2. The method of claim 1, wherein the small base station transmitting the intercepted data comprises:
   establishing, by the small base station, an intercepted data transmission channel for transmission of the intercepted data between the small base station and the core network device; and
   transmitting, by the small base station, the intercepted data to the core network device via the intercepted data transmission channel.

3. The method of claim 1, wherein the small base station transmitting the intercepted data comprises:

transmitting, by the small base station, uplink and downlink traffic data of the interception target.

4. A method for interception based on Local Break Out (LBO), comprising:
receiving, by a small base station, an interception task generated by a core network device based on an interception request from an interception gateway and instructing the small base station to intercept an interception target;
intercepting, by the small base station, LBO data of the interception target based on the interception task to obtain intercepted data; and
transmitting, by the small base station, the intercepted data,
wherein the interception task is transmitted by an interception proxy to which the interception target belongs,
the small base station receiving the interception task comprises: receiving, by the small base station, the interception task generated by the interception proxy to which the interception target belongs based on an interception request from an interception gateway,
the small base station transmitting the intercepted data comprises: transmitting, by the small base station, the intercepted data to the interception proxy, such that the interception proxy forwards the intercepted data, and
the method further comprises, subsequent to the small base station receiving the interception task:
assigning, by the small base station, a feature value for each bearer of the interception target, for associating the intercepted data with a corresponding bearer of the interception target; and
transmitting, by the small base station, the intercepted data carrying the feature value to the interception proxy, wherein the feature value associates the intercepted data with the corresponding bearer of the interception target for each bearer of the interception target.

5. The method of claim 4, wherein the intercepted data comprises signaling data and traffic data, the traffic data comprising uplink and downlink traffic data of the interception target and the signaling data comprising at least one of:
data on attachment time of the interception target, data on geographical location of the interception target, data on a bearer used by the interception target, a signaling message for the interception target.

6. The method of claim 4, wherein the interception task carries an address for storing the intercepted data and the small base station transmitting the intercepted data comprises:
transmitting, by the small base station, the intercepted data to the interception proxy, such that the interception proxy forwards the intercepted data to the address.

7. An electronic device, comprising at least one processor and a memory connected communicatively to the at least one processor, the memory storing instructions executable by the at least one processor for performing the method according to claim 4.

8. An electronic device, comprising at least one processor and a memory connected communicatively to the at least one processor, the memory storing instructions executable by the at least one processor for performing the method according to claim 1.

9. A device for interception based on Local Break Out (LBO), comprising:
at least one processor; and
a memory communicatively connected to the at least one processor,
wherein the memory stores instructions executable by the at least one processor, and the instructions comprises:
a receiving unit configured to receive an interception task generated by a core network device based on an interception request from an interception gateway and instructing a small base station to intercept an interception target, the interception task carrying a feature value;
an intercepting unit configured to intercept LBO data of the interception target based on the interception task to obtain intercepted data, and configured to associate the intercepted data with a corresponding bearer of the interception target for each bearer of the interception target utilizing the feature value; and
a transmitting unit configured to transmit the intercepted data to the interception proxy.

10. The device of claim 9, wherein the transmitting unit comprises:
an establishing module configured to establish an intercepted data transmission channel for transmission of the intercepted data between the small base station and the core network device; and
a transmitting module configured to transmit the intercepted data to the core network device via the intercepted data transmission channel.

11. The device of claim 9, wherein the transmitting unit is further configured to transmit uplink and downlink traffic data of the interception target.

12. A device for interception based on Local Break Out (LBO), comprising:
at least one processor; and
a memory communicatively connected to the at least one processor,
wherein the memory stores instructions executable by the at least one processor, and the instructions comprise performing the steps of claim 4.

13. The device of claim 12, wherein the intercepted data comprises signaling data and traffic data, the traffic data comprising uplink and downlink traffic data of the interception target and the signaling data comprising at least one of:
data on attachment time of the interception target, data on geographical location of the interception target, data on a bearer used by the interception target, a signaling message for the interception target.

14. The device of claim 12, wherein the interception task carries an address for storing the intercepted data and the small base station transmitting the intercepted data comprises transmitting, by the small base station, the intercepted data to the interception proxy, such that the interception proxy forwards the intercepted data to the address.

* * * * *

UNITED STATES PATENT AND TRADEMARK OFFICE
CERTIFICATE OF CORRECTION

PATENT NO. : 10,986,495 B2  
APPLICATION NO. : 16/085734  
DATED : April 20, 2021  
INVENTOR(S) : Yanguang Wu Page 1 of 1

It is certified that error appears in the above-identified patent and that said Letters Patent is hereby corrected as shown below:

In the Claims

Claim 4, Column 19, Line 30, change "a" to --the--

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*